(12) United States Patent
Cho et al.

(10) Patent No.: US 8,133,943 B2
(45) Date of Patent: Mar. 13, 2012

(54) POLYLACTIC ACID/POLYCARBONATE RESIN COMPOSITION AND MOLDED PRODUCT USING THE SAME

(75) Inventors: Jin-Kyung Cho, Uiwang-si (KR); Hyung-Tak Lee, Uiwang-si (KR); Doo-Han Ha, Uiwang-si (KR); Chang-Do Jung, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/620,841

(22) Filed: Nov. 18, 2009

(65) Prior Publication Data

US 2010/0160499 A1   Jun. 24, 2010

(30) Foreign Application Priority Data

Dec. 19, 2008   (KR) .................. 10-2008-0130526

(51) Int. Cl.
*C08G 18/80* (2006.01)
(52) U.S. Cl. ............ 524/86; 524/80; 524/115; 524/261; 524/401; 525/190; 525/340; 525/342; 525/374; 525/410; 525/413; 525/415; 525/450; 525/468; 525/902
(58) Field of Classification Search ............... 524/80, 524/86, 115, 261, 401; 525/340, 342, 374, 525/410, 413, 415, 450, 468, 902, 190
See application file for complete search history.

(56) References Cited

U.S. PATENT DOCUMENTS

| | | | |
|---|---|---|---|
| 6,545,089 B1 * | 4/2003 | DeRudder et al. | 525/63 |
| 7,863,382 B2 | 1/2011 | Ishii et al. | |
| 2006/0276582 A1 | 12/2006 | Mochizuki et al. | |
| 2008/0071038 A1 | 3/2008 | Ido | |
| 2008/0108754 A1 * | 5/2008 | Hayata et al. | 525/191 |
| 2010/0028657 A1 * | 2/2010 | Ito et al. | 428/327 |

FOREIGN PATENT DOCUMENTS

| | | | |
|---|---|---|---|
| EP | 1792941 A1 | | 6/2007 |
| EP | 1953191 A1 | | 8/2008 |
| EP | 2113532 A1 | | 11/2009 |
| JP | 2004-190026 A | | 7/2004 |
| JP | 2006-111858 A | | 4/2006 |
| JP | 2006-182994 A | | 7/2006 |
| JP | 2006-335909 A | | 12/2006 |
| JP | 2007-056247 A | | 3/2007 |
| JP | 2007-291172 A | | 11/2007 |
| JP | 2007-308648 | | 11/2007 |
| JP | 2008-106090 | | 5/2008 |
| JP | 2008-274222 A | | 11/2008 |
| JP | 2008-303320 | * | 12/2008 |
| KR | 10-2007-0084077 A | | 8/2007 |
| KR | 10-2008-0072740 A | | 8/2008 |
| WO | WO 2006/051686 | * | 5/2006 |
| WO | 2006097979 A1 | | 9/2006 |
| WO | 2008/102536 A | | 8/2008 |
| WO | WO 2008/102536 | * | 8/2008 |

OTHER PUBLICATIONS

European Search Report in counterpart European Application No. 09180167 dated Dec. 19, 2011, pp. 1-6.

* cited by examiner

*Primary Examiner* — David W Wu
*Assistant Examiner* — Robert Jones, Jr.
(74) *Attorney, Agent, or Firm* — Summa, Additon & Ashe, P.A.

(57) ABSTRACT

Disclosed is a polylactic acid/polycarbonate resin composition including (A) about 100 parts by weight of a mixed resin including: (a1)) about 10 to about 90 wt % of a polycarbonate resin and (a2) about 10 to about 90 wt % of a polylactic acid resin; (B) about 1 to about 50 parts by weight of a flame retardant based on about 100 parts by weight of the mixed resin; (C) about 1 to about 30 parts by weight of an acryl-based copolymer based on about 100 parts by weight of the mixed resin; and (D) about 1 to about 20 parts by weight of an impact-reinforcing agent based on about 100 parts by weight of the mixed resin.

9 Claims, No Drawings

POLYLACTIC ACID/POLYCARBONATE RESIN COMPOSITION AND MOLDED PRODUCT USING THE SAME

RELATED APPLICATIONS

This application claims priority to and the benefit of Korean Patent Application No. 10-2008-0130526 filed in the Korean Intellectual Property Office on Dec. 19, 2008, the entire disclosure of which is incorporated herein by reference.

FIELD OF THE INVENTION

The present application relates to a polylactic acid/polycarbonate resin composition and a molded product using the same.

BACKGROUND OF THE INVENTION

There has been much research on the development of strong and safe polymer materials for special purposes. However, discarded polymers are now socially recognized as a severe environmental problem all over the world, leading to efforts to develop environmentally-friendly polymer materials as an alternative.

Environmentally-friendly polymers may be primarily classified into photodegradable and biodegradable polymers. Biodegradable polymers typically include a functional group that can be decomposed by microorganisms.

Among these polymers, aliphatic polyester polymer has gained the most attention, since it has excellent working properties and easily adjustable decomposition characteristics. In particular, polylactic acid (PLA) has a world-wide market share of 150,000 tons and expansively covers the field where plastic is commonly used, for example, as food packaging materials and containers, cases for electronics, and the like. Polylactic acid resin has been primarily used for disposable products such as food containers, wraps, films, and the like due to its biodegradable characteristics. Current examples of polylactic acid include those produced by American Natureworks LLC, Japanese Toyota Motor Co., and the like.

However, conventional polylactic acid resin can lack adequate molding property, mechanical strength, and heat resistance, and may be easily destroyed, when fabricated into a thin film. Further, since it has low resistance to high temperatures, molded products made therefrom may also be distorted at 60° C. or higher.

Japanese Patent Laid-Open Publication Nos. 2004-190026, 2006-335909, and 2006-182994 disclose melt mixing polylactic acid, a polycarbonate, and a flame retardant. However, the polycarbonate insufficiently improves the weak mechanical and thermal properties of the polylactic acid.

Japanese Patent Laid-Open Publication No. 2006-111858 discloses a method of mixing a compatibilizer with a polylactic acid resin/polycarbonate resin to improve the appearance of a molded product. However, this publication does not disclose improved mechanical strength and heat resistance.

Japanese Re-laid-Open Patent No. WO06/097979 discloses a polylactic acid/thermoplastic resin including a compatibilizer, but this resin is not flame retardant. In addition, this publication does not clarify how to prepare the compatibilizer.

SUMMARY OF THE INVENTION

One aspect of the present invention provides a polylactic acid/polycarbonate resin composition which can improve the appearance of a molded product as well as have good heat resistance, impact strength, flame retardancy, and mechanical properties.

Another aspect of the present invention provides a molded product fabricated using the polylactic acid/polycarbonate resin composition.

According to one aspect of the present invention, provided is a polylactic acid/polycarbonate resin composition including: (A) about 100 parts by weight of a mixed resin including (a1)) about 10 to about 90 wt % of a polycarbonate resin and (a2) about 10 to about 90 wt % of a polylactic acid resin; (B) about 1 to about 50 parts by weight of a flame retardant; (C) about 1 to about 30 parts by weight of an acryl-based copolymer; and (D) about 1 to about 20 parts by weight of an impact-reinforcing agent, wherein the amount of each of (B), (C) and (D) is based on about 100 parts by weight of the mixed resin.

The polylactic acid resin may have a weight average molecular weight ranging from about 80,000 to about 300,000 g/mol.

The flame retardant can include a phosphorus-based flame retardant, a nitrogen compound-based flame retardant, a silicon-based flame retardant, an inorganic flame retardant, or a combination thereof.

The acryl-based copolymer may have a weight average molecular weight ranging from about 500,000 to about 10,000,000 g/mol, for example, from about 1,000,000 to about 10,000,000 g/mol. In addition, the acryl-based copolymer may be a copolymer including two or more monomers selected from linear alkyl (meth)acrylate monomers, branched alkyl (meth)acrylate monomers, cyclic alkyl (meth)acrylate monomers, or combinations thereof; or a copolymer including a monomer selected from linear alkyl (meth)acrylate monomers, branched alkyl (meth)acrylate monomers, cyclic alkyl (meth)acrylate monomers, or combinations thereof, and a reactive group grafted thereinto.

The impact-reinforcing agent may be selected from core-shell copolymers, linear olefin-based copolymers, or combinations thereof. Copolymers having a core-shell structure can be prepared by grafting one or more unsaturated monomers selected from acryl-based monomers, aromatic vinyl monomers, unsaturated nitrile monomers, or combinations thereof into a rubbery polymer polymerized using one or more monomers selected from diene-based monomers, acryl-based monomers, silicon-based monomers, or combinations thereof.

According to another aspect of the present invention, provided is a product molded using the polylactic acid/polycarbonate resin composition.

Hereinafter, further aspects of the present invention will be described in detail.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, unless a specific definition is otherwise provided, the term "(meth)acrylate" refers to both "acrylate" and "methacrylate". In addition, the term "(meth)acrylic acid alkyl ester" refers to both "acrylic acid alkyl ester" and "methacrylic acid alkyl ester," and "(meth)acrylic acid ester" refers to both "acrylic acid ester" and "methacrylic acid ester."

The polylactic acid/polycarbonate resin composition according to one embodiment includes: (A) a mixed resin including (a1)) a polycarbonate resin and (a2) a polylactic acid resin; (B) a flame retardant; (C) an acryl-based copolymer; and (D) an impact-reinforcing agent.

Exemplary components included in the polylactic acid/polycarbonate resin composition according to embodiments of the invention will hereinafter be described in detail. However, these embodiments are only exemplary, and the present invention is not limited thereto.

(A) Mixed Resin

According to one embodiment, the mixed resin includes (a1) a polycarbonate (PC) resin and (a2) a polylactic acid (PLA) resin.

(a1) Polycarbonate Resin

The polycarbonate resin according to one embodiment may be prepared by reacting one or more diphenols of the following Formula 1 with a phosgene, a halogen acid ester, a carbonate ester, or a combination thereof.

[Chemical Formula 1]

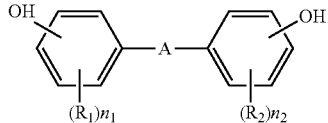

In the above Chemical Formula 1,

A is a linker and can be a single bond, substituted or unsubstituted C1 to C30 linear or branched alkylene, substituted or unsubstituted C2 to C5 alkenylene, substituted or unsubstituted C2 to C5 alkylidene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear or branched alkoxylene, halogen acid ester, carbonate ester, CO, S, or $SO_2$, each of $R_1$ and $R_2$ is independently substituted or unsubstituted C1 to C30 alkyl or substituted or unsubstituted C6 to C30 aryl, and $n_1$ and $n_2$ are each independently integers ranging from 0 to 4.

As used herein, unless another definition is otherwise provided, the term "substituted" refers to one substituted with at least one substituent selected from halogen, C1 to C30 alkyl, C1 to C30 haloalkyl, C6 to C30 aryl, C1 to C20 alkoxy, or a combination thereof instead of hydrogen.

The diphenols represented by the above Formula 1 may be used in combinations to constitute repeating units of the polycarbonate resin. Exemplary diphenols useful in the present invention include without limitation hydroquinone, resorcinol, 4,4'-dihydroxydiphenyl, 2,2-bis(4-hydroxyphenyl)propane (referred to as "bisphenol-A"), 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof. In one exemplary embodiment, the diphenol can be 2,2-bis(4-hydroxyphenyl)propane, 2,2-bis(3,5-dichloro-4-hydroxyphenyl)propane, or 1,1-bis(4-hydroxyphenyl)cyclohexane, and in another embodiment, 2,2-bis(4-hydroxyphenyl)propane.

In one embodiment, the polycarbonate resin can have a weight average molecular weight ranging from about 10,000 to about 200,000 g/mol, and in another embodiment a weight average molecular weight ranging from about 15,000 to about 80,000, but the present invention is not limited thereto.

The polycarbonate resin may include a mixture of polycarbonate resins obtained using two or more dipenols that are different from each other. Exemplary polycarbonate resins include without limitation linear polycarbonate resins, branched polycarbonate resins, polyester carbonate copolymers, and the like, and combinations thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with diphenols and a carbonate. The multi-functional aromatic compound may be included in an amount of about 0.05 to about 2 mol % based on the total weight of the branched polycarbonate resin. The polyester carbonate copolymer resin may be produced by reacting a difunctional carboxylic acid with diphenols and a carbonate. The carbonate may include a diaryl carbonate such as diphenyl carbonate, ethylene carbonate, and the like, or a combination thereof.

The mixed resin may include the polycarbonate resin in an amount of about 10 to about 90 wt %, and in one embodiment, about 20 to about 80 wt %, based on the total weight of the mixed resin of the polycarbonate resin and the polylactic acid resin. When the polycarbonate resin is included within these ranges, it can improve heat resistance and impact strength, as well as provide environmentally-friendly properties.

(a2) Polylactic Acid Resin

In general, the polylactic acid is a polyester-based resin prepared by ester reaction of lactic acid as a monomer. The lactic acid can be acquired through decomposition of cornstarch and can be commercially available.

The polylactic acid resin may include a repeating unit derived from L-lactic acid, D-lactic acid, L,D-lactic acid, or a combination thereof.

The polylactic acid resin may include more than about 95 wt % of a repeating unit derived from L-lactic acid to provide a balance between heat resistance and molding property. For example, the polylactic acid resin may include about 95 to about 100 wt % of a repeating unit derived from L-lactic acid and about 0 to about 5 wt % of a repeating unit derived from D-lactic acid. As another example, the polylactic acid resin may include about 98 to about 99.99 wt % of a repeating unit derived from L-lactic acid and about 0.01 to about 2 wt % of a repeating unit derived from D-lactic acid. The aforementioned composition can have a balance between heat resistance and molding property, and excellent hydrolytic resistance.

There is no particular limitation on the molecular weight or the molecular weight distribution of the polylactic acid resin as long as it can be molded. However, the polylactic acid resin may have a weight average molecular weight of about 80,000 g/mol or more, and as another example a weight average molecular weight ranging from about 80,000 to about 300,000 g/mol.

When the polylactic acid resin has a weight average molecular weight within these ranges, it may contribute to the balance of mechanical strength and heat resistance of the molded product.

The polylactic acid resin may include, for example, a polylactic acid homopolymer, a polylactic acid copolymer, or a combination thereof.

The polylactic acid homopolymer may be a polymer prepared by open ring-polymerizing a lactic acid selected from L-lactic acid, D-lactic acid, or a combination thereof.

The polylactic acid copolymer can be a random or block copolymer with a component capable of being copolymerized with the polylactic acid polymer. The component capable of being copolymerized with the polylactic acid polymer may include a compound having at least two functional groups capable of forming an ester bond in the molecule structure.

Exemplary compounds having at least two functional groups that can form an ester bond in the molecule structure may include (a) dicarboxylic acids, (b) polyhydric alcohols, (c) hydroxy carbonic acids other than lactic acid, (d) lactones, and (e) polyesters, polyethers, polycarbonates, and the like, which are derived from the above compounds.

Exemplary (a) dicarboxylic acids may include without limitation C4 to C50 linear or branched saturated or unsaturated aliphatic dicarboxylic acids, C8 to C20 aromatic dicarboxylic acids, polyether dicarboxylic acids, and the like, and combinations thereof.

Exemplary aliphatic dicarboxylic acids may include without limitation succinic acid, adipic acid, sebacic acid, decanedicarboxylic acid, and the like, and combinations thereof. Exemplary aromatic dicarboxylic acids may include without limitation phthalic acid, terephthalic acid, isophthalic acid, and the like, and combinations thereof. Exemplary polyether dicarboxylic acids may include without limitation dicarboxylic acid having a carboxylmethyl group at both ends of a polyalkylene ether such as polyethylene glycol, polypropylene glycol, polybutylene glycol, polyethylene polypropylene glycol, and the like, and combinations thereof.

Exemplary (b) polyhydric alcohols may include without limitation aliphatic polyols, aromatic polyhydric alcohols, polyalkylene ethers, and the like, and combinations thereof.

Exemplary aliphatic polyols may include without limitation C2 to C50 aliphatic polyols having 2 to 4 hydroxy groups such as butane diol, hexane diol, octane diol, decane diol, 1,4-cyclohexanedimethanol, glycerine, sorbitan, trimethylolpropane, neopentyl glycol, and the like, and combinations thereof.

Exemplary aromatic polyhydric alcohols may include without limitation C6 to C20 aromatic diols such as bishydroxy methyl benzene, hydroquinone, and the like, and combinations thereof, or aromatic diols prepared by adding C2 to C4 alkylene oxides such as ethylene oxide, propylene oxide, butylene oxide to bisphenols such as bisphenol A, bisphenol F, and the like, and combinations thereof, and then reacting them together.

In addition, the polyalkylene ethers may include without limitation ether glycols such as diethylene glycol, triethylene glycol, polyethylene glycol, polypropylene glycol, and the like, and combinations thereof.

Exemplary (c) hydroxy carbonic acids other than lactic acid may include without limitation C3 to C10 hydroxy carbonic acids such as glycol acid, hydroxy butyl carbonic acid, 6-hydroxy caproic acid, and the like, and combinations thereof.

Exemplary (d) lactones may include without limitation glycolide, ε-caprolactone glycolide, ε-caprolactone, β-propionolactone, δ-butyrolactone, β-butyrolactone, γ-butyrolactone, δ-valerolactone, and the like, and combinations thereof.

The (e) various polyesters, polyethers, and polycarbonates which may be used to prepare a lactic acid copolymer are not limited if conventionally used for that, but in particular, is polyester is included among these.

An exemplary polyester may include without limitation an aliphatic polyester prepared from an aliphatic dicarboxylic acid and an aliphatic diol.

Exemplary aliphatic dicarboxylic acids may include without limitation succinic acid, adipic acid, sebacic acid, decanedicarboxylic acid, and the like, and combinations thereof. Exemplary aliphatic diols may include without limitation C2 to C20 aliphatic diols such as ethylene glycol, propane diol, butane diol, hexane diol, octane diol, and the like, polyalkylene ethers (a single polymer or a copolymer) such as polyethylene glycol, polypropylene glycol, polybutylene glycol, and the like, polyalkylene carbonates, and the like, and combinations thereof.

The mixed resin may include the polylactic acid resin in an amount of about 10 to about 90 wt %, for example, in an amount of about 20 to about 80 wt %, based on the total weight of the mixed resin of a polycarbonate resin and a polylactic acid resin. When the polylactic acid resin is included within these ranges, it can provide excellent heat resistance and impact strength, and environmentally-friendly effects.

(B) Flame Retardant

The flame retardant is not particularly limited. In exemplary embodiments, the flame retardant can be a phosphorus-based flame retardant, a nitrogen compound-based flame retardant, a silicon-based flame retardant, an inorganic flame retardant, or a combination thereof.

Exemplary phosphorus-based flame retardants may include without limitation organic phosphorus-based compounds such as phosphoric acid esters, poly phosphoric acid salts, and the like, or red phosphorus, as well as combinations thereof.

Exemplary phosphorus-based flame retardants may include without limitation trimethyl phosphoric acid salt, triethyl phosphoric acid salt, tributyl phosphoric acid salt, trihexyl phosphoric acid salt, tributoxyethyl phosphoric acid, triphenyl phosphoric acid salt, tricresyl phosphoric acid salt, trixylenol phosphoric acid salt, triisopropylphenyl phosphoric acid salt, triphenyl phosphoric acid salt, trinaphthyl phosphoric acid salt, cresyl diphenyl phosphoric acid salt, xylenoldiphenyl phosphoric acid salt, diphenyl phosphoric acid salt, methacryloyl oxyethyl phosphoric acid salt, diphenylacryloyloxyethyl phosphoric acid salt, diphenyl methacryloyloxyethyl phosphoric acid salt, melamine phosphoric acid salt, dimelamine phosphoric acid salt, melaminepyro phosphoric acid salt, triphenylphosphine oxide, tricresyl phosphineoxide, methanephosphoric acid diphenyl, phenylphosphoric acid hydroxylphosphoric acid salt, a condensed phosphoric acid ester of condensed materials thereof, and the like, and combinations thereof.

Commercially-available examples of condensed phosphoric acid esters may include without limitation PX-200, PX-201, PX-202, CR-733S, CR-741, CR-747, and the like made by DAIHACHI CHEMICAL INDUSTRY CO., LTD.

Exemplary nitrogen compound-based flame retardants may include without limitation aliphatic amine compounds, aromatic amine compounds, heterocyclic nitrogen compounds, cyan compounds, aliphatic amides, aromatic amides, ureas, thio ureas, and the like, and combinations thereof.

Exemplary aliphatic amine compounds may include without limitation ethyl amine, butyl amine, diethyl amine, ethylene diamine, triethylene tetramine, diamino cyclohexane, diamino cyclooctane, guanine, diamino purine, tripyridine, a triazine compound, and the like, and combinations thereof.

Exemplary silicon-based flame retardants may include without limitation silicone resins, silicone oils, and combinations thereof.

Exemplary silicone resins may include without limitation resins having a three dimensional net structure and that are capable of forming a unit such as $RSiO_{3/2}$, $RSiO$, and $RSiO_{1/2}$. As used herein with reference to the silicone resins, R indicates a C1 to C10 alkyl group such as a methyl group, an ethyl group, a propyl group, and the like, an aromatic group, or the above substituents further including a vinyl group.

Exemplary silicone oils may include without limitation modified polysiloxanes including at least one methyl group at the side chain or the end of poly dimethyl siloxane, and poly dimethyl siloxanes modified by hydrogen, alkyl, cyclohexyl, phenyl, benzyl, epoxy, polyether, carboxyl, mercapto, chloro alkyl, alkyl alcohol ester, alcohol, allyl, vinyl, trifluoro methyl, and combinations or mixtures thereof.

Exemplary inorganic flame retardants may include without limitation silicon oxide ($SiO_2$), magnesium hydroxide, aluminum hydroxide, antimony trioxide, antimony pentaoxide, antimony, sodium carbonate, hydroxy zinc tartrate, zinc tartrate, meta tartaric acid, zinc sulfate, zinc oxide, ferrous oxide, ferric oxide, tin oxide (SnO), tin dioxide ($SnO_2$), zinc borate, calcium borate, ammonium borate, ammonium octamolybdate, metal salts of tungstenate, composite oxides of tungsten and a metalloid, zirconium-based compounds, guanidine-based compounds, graphite, talc, expanded graphite, and the like, and combinations thereof. In an exemplary embodiment, the inorganic flame retardant can be aluminum hydroxide and talc.

The polylactic acid/polycarbonate resin composition can include the flame retardant in an amount of about 1 to about 50 parts by weight, for example about 5 to about 30 parts by weight, based on about 100 parts by weight of the mixed resin of a polycarbonate resin and a polylactic acid resin. When the flame retardant is included within these ranges, the polylactic acid/polycarbonate composition can exhibit excellent impact resistance and heat resistance as well as excellent flame retardancy.

(C) Acryl-Based Copolymer

According to one embodiment, an acryl-based copolymer can be used as a compatibilizer.

The acryl-based copolymer may be a copolymer including at least two or more monomers selected from linear alkyl (meth)acrylate monomers, branched alkyl (meth)acrylate monomers, cyclic alkyl (meth)acrylate monomers, or combinations thereof. As used herein with reference to the acryl-based copolymer, the term "alkyl" refers to a C1 to C18 alkyl.

Exemplary linear alkyl (meth)acrylates may include without limitation methyl acrylate, ethyl acrylate, n-butyl acrylate, lauryl acrylate, stearyl acrylate, methyl methacrylate, ethyl methacrylate, n-butyl methacrylate, lauryl methacrylate, stearyl methacrylate, tridecyl methacrylate, i-butyl methacrylate, t-butyl methacrylate, and the like, and combinations thereof.

Exemplary branched alkyl (meth)acrylates may include without limitation 2-ethylhexyl acrylate, 2-ethylhexyl methacrylate, and the like, and combinations thereof.

Exemplary cyclic alkyl (meth)acrylates may include without limitation cyclohexyl acrylate, cyclohexyl methacrylate, and the like, and combinations thereof.

Specific examples of the acryl-based copolymer may include a copolymer including methylmethacrylate monomer and at least one additional monomer selected from linear, branched, and cyclic alkyl (meth)acrylates, and combinations thereof excluding methylmethacrylate. The copolymer can include about 60 to about 95 wt % of a methylmethacrylate monomer and about 5 to about 40 wt % of the other monomers, for example, about 75 to about 85 wt % of a methylmethacrylate monomer and about 15 to about 25 wt % of the other monomers. When the acryl-based copolymer has the aforementioned composition, it can impart excellent appearance to a molded product.

The acryl-based copolymer may have a weight average molecular weight ranging from about 500,000 to about 10,000,000 g/mol, for example about 1,000,000 to about 10,000,000 g/mol, as another example about 1,000,000 to about 5,000,000 g/mol, and as yet another example about 1,500,000 to about 4,000,000 g/mol. When the acryl-based copolymer has a weight average molecular weight within these ranges, the molded product can have excellent impact strength and appearance.

The acryl-based copolymer can be prepared using emulsion polymerization, suspension polymerization, solution polymerization, and the like. The emulsion polymerization can be performed using a common emulsifier, a polymerization initiator, a redox catalyst, and the like.

In an exemplary embodiment, the acryl-based copolymer can be prepared using about 0.5 to about 5 parts by weight of the emulsifier, about 0.0005 to about 0.005 parts by weight of the polymerization initiator, and about 0.01 to about 0.1 parts by weight of the redox catalyst based on about 100 parts by weight of a monomer therein.

The emulsifier is not particularly limited, and may include without limitation anionic emulsifiers such as aliphatic esters, alkyl benzene sulfonates, alkyl phosphate salts, dialkyl sulfosuccinates, and the like, or non-ionic emulsifiers such as polyoxyethylene alkyl ethers, alkylamine esters, and the like, singularly or in combination.

Exemplary polymerization initiators may include without limitation water-soluble initiators such as potassium persulfate, ammonium persulfate, sodium persulfate, and the like; fat-soluble initiators including an organic peroxide such as t-butyl hydroperoxide, cumene hydroperoxide, benzoyl peroxide, lauryl peroxide, and the like; and redox initiators, and the like, and combinations thereof.

Exemplary redox catalysts may include without limitation sodium formaldehyde sulfoxylate, disodium ethylene diamine tetraacetate, ferrous sulfate, copper sulfate ($CuSO_4$), and the like, and combinations thereof.

The acryl-based copolymer may include a copolymer polymerized by grafting a reactive group like an epoxy group into a monomer selected from linear alkyl (meth)acrylate monomers, branched alkyl (meth)acrylate monomers, cyclic alkyl (meth)acrylate monomers, or combination thereofs. Herein, the acryl-based copolymer can include the reactive group in an amount of about 1 to about 40 wt % based on the entire weight of the acryl-based copolymer. When the reactive group is included within this range, it can improve mechanical strength such as impact strength, hardness, and the like.

According to one embodiment, an acryl-based copolymer having no reactive group can be used for applications requiring excellent appearances.

The polylactic acid/polycarbonate resin composition can include the acryl-based copolymer in an amount of about 1 to about 30 parts by weight, for example about 1 to about 15 parts by weight, based on 100 parts by weight of the mixed resin of a polycarbonate resin and a polylactic acid resin. When included within these ranges, the acryl-based copolymer can secure excellent flame retardancy.

(D) Impact-Reinforcing Agent

The impact-reinforcing agent has excellent affinity to the polylactic acid resin, and can be a core-shell copolymer, a linear olefin-based copolymer, or a combination thereof.

The core-shell copolymer has a core-shell structure. When an unsaturated monomer is grafted into the core of rubber, a hard shell is formed. The unsaturated monomer may be an acryl-based monomer, an aromatic vinyl monomer, an unsaturated nitrile monomer, or a combination thereof, and can be grafted into a rubbery polymer polymerized using a monomer selected from diene-based monomers, acryl-based monomers, silicon-based monomers, or combinations thereof.

Exemplary diene-based monomers for the rubber polymer may include without limitation butadiene, isoprene, and the like, and combinations thereof.

Exemplary acryl-based monomers for the rubber polymer may include without limitation methylacrylate, ethylacrylate, n-propylacrylate, n-butylacrylate, 2-ethylhexylacrylate, hexylmethacrylate, 2-ethylhexylmetaacrylate, and the like, and combinations thereof. Curing agents such as ethylene glycol dimethacrylate, propylene glycol dimethacrylate, 1,3-butylene glycol dimethacrylate, 1,4-butylene glycol dimethacrylate, allylmethacrylate, triallylcyanurate, and the like, and combinations thereof may be used.

Exemplary silicon-based monomers for the rubber polymer can be prepared from cyclosiloxanes such as but not limited to hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. Curing agents such as but not limited to trimethoxymethylsilane, triethoxyphenylsilane, tetramethoxysilane, tetraethoxysilane, and the like, and combinations thereof may be used.

The rubbery polymer can have a rubber average particle diameter ranging from about 0.4 to about 1 μm, which can provide a good balance between impact resistance and coloring property.

Exemplary unsaturated monomers that can be grafted onto the rubber core can include without limitation acryl-based monomers, such as (meth)acrylic acid alkyl esters, (meth)acrylic acid esters, and the like, and combinations thereof. In an exemplary embodiment, the unsaturated monomers may be a (meth)acrylic acid alkyl ester having no reactive group, a (meth)acrylic acid ester, or a combination thereof. An impact-reinforcing agent including the acryl-based monomer having no reactive group grafted into the rubbery polymer can provide excellent appearance. As used herein with reference to the acryl-based monomers suitable for forming the shell of the core-shell copolymer, the term "alkyl" refers to C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof.

In addition, the anhydride may include an acid anhydride. In particular, it may include carboxylic acid anhydride such as anhydrous maleic acid, anhydrous itaconic acid, and the like, and combinations thereof.

Exemplary aromatic vinyl monomers may include without limitation styrene, C1-C10 alkyl substituted styrene, halogen-substituted styrene, and combinations thereof. Exemplary alkyl substituted styrenes may include without limitation o-ethyl styrene, m-ethyl styrene, p-ethyl styrene, alphamethyl styrene, and the like, and combinations thereof.

Exemplary unsaturated nitrile monomers may include without limitation acrylonitrile, methacrylonitrile, ethacrylonitrile, and the like, and combinations thereof.

The core-shell copolymer may include about 50 to about 90 wt % of the rubbery polymer and about 10 to about 50 wt % of the unsaturated monomer. When the core-shell copolymer has the aforementioned composition, it can provide excellent compatibility with a resin, and as a result, remarkably reinforces impact strength.

Exemplary linear olefin-based copolymers may include without limitation copolymers of an olefin-based monomer and an acryl-based monomer.

Exemplary olefin-based monomers may include without limitation ethylene, propylene, isopropylene, butylene, isobutylene, and the like, singularly or in combination.

Exemplary acryl-based monomers suitable for the linear olefin-based copolymer may include without limitation (meth)acrylic acid alkyl esters, (meth)acrylic acid esters, and the like, and combinations thereof. As used herein with reference to the acryl-based monomers for the linear olefin-based copolymer, the term "alkyl" refers to C1 to C10 alkyl. Exemplary (meth)acrylic acid alkyl esters may include without limitation methyl(meth)acrylate, ethyl(meth)acrylate, propyl(meth)acrylate, butyl(meth)acrylate, and the like, and combinations thereof. Exemplary (meth)acrylic acid esters may include without limitation (meth)acrylate, and the like.

The linear olefin-based copolymer can be prepared using a Ziegler-Natta catalyst, which is a common olefin polymerization catalyst. It can be prepared by using a metallocene-based catalyst in order to make a more selective structure.

A reactive group such as anhydrous maleic acid and the like can be grafted into an olefin-based copolymer in order to improve dispersion with a polylactic acid resin. The method of grafting a reactive group into a linear olefin-based copolymer can be easily performed by those of ordinary skill in the art.

According to one embodiment, an impact-reinforcing agent, in particular, the linear olefin-based copolymer having no reactive group, can be used in applications requiring excellent appearance.

According to one embodiment, the polylactic acid/polycarbonate resin composition can include the impact-reinforcing agent in an amount of about 1 to about 20 parts by weight, for example about 3 to about 10 parts by weight, based on about 100 parts by weight of the mixed resin of a polycarbonate resin and a polylactic acid resin. When included within these ranges, the impact-modifying agent can maximize impact reinforcement and heat resistance and improve fluidity, and thereby improve the injection molding property.

(E) Other Additives

In exemplary embodiments, the polylactic acid/polycarbonate resin composition can further include one or more additives.

Exemplary additives include without limitation antibacterial agents, heat stabilizers, antioxidants, release agents, light stabilizers, compatibilizers, inorganic material additives, surfactants, coupling agents, plasticizers, admixtures, stabilizers, lubricants, antistatic agents, flame-proofing agents, weather-resistance agents, colorants, ultraviolet (UV) blocking agents, fillers, nucleating agents, adhesion aids, adhesives, and the like, and combinations thereof.

Exemplary antioxidants may include without limitation phenols, phosphites, thioethers, amines, and the like, and combinations thereof. Exemplary release agents may include without limitation fluorine-containing polymers, silicone oils, metal salts of stearic acid, metal salts of montanic acid, montanic acid ester waxes, polyethylene waxes, and the like, and combinations thereof. Exemplary weather-resistance agents may include without limitation benzophenones, amines, and the like, and combinations thereof. Exemplary colorants may include without limitation dyes, pigments, and the like and combinations thereof. Exemplary ultraviolet (UV) blocking agents may include without limitation titanium dioxide ($TiO_2$), carbon black, and the like, and combinations thereof. Exemplary fillers may include without limitation glass fibers, carbon fibers, silica, mica, alumina, clay, calcium carbonate, sulfuric acid calcium, glass beads, and the like, and combinations thereof. When the filler is included, it can improve mechanical strength, heat resistance, and the like. Exemplary nucleating agents may include without limitation clay, and the like, and combinations thereof.

The polylactic acid/polycarbonate resin composition can include one or more additives in an amount of about 0.1 to about 30 parts by weight based on about 100 parts by weight of the mixed resin of a polycarbonate resin and a polylactic acid resin. When included within this range, each additive can bring about various desired effects, and also provide excellent mechanical properties and improve surface appearance.

According to one embodiment, a polylactic acid/polycarbonate resin composition can be prepared by adding a polycarbonate resin, a polylactic acid resin, a flame retardant, an acryl-based copolymer, and an impact-reinforcing agent. In other words, the composition can be prepared by simultaneously mixing a polycarbonate resin, a polylactic acid resin, a flame retardant, an acryl-based copolymer, and an impact-reinforcing agent, or by mixing a polylactic acid resin and the impact-reinforcing agent to form a masterbatch and then mixing the masterbatch with the other components of the polylactic acid/polycarbonate resin composition (master-disposing the mixture).

The master-disposing method can decrease the difference in viscosity between a polycarbonate resin and a polylactic acid resin, since the polylactic acid resin with a comparatively lower viscosity than the polycarbonate resin may have deteriorated fluidity due to the impact-reinforcing agent.

In addition, according to one embodiment, pellets can be prepared from the polylactic acid/polycarbonate resin composition using well-known methods. For example, the pellets can be prepared by mixing each component of the present invention and additives and then melt-extruding the mixture in an extruder.

According to one embodiment, provided is a product molded by using the polylactic acid/polycarbonate resin composition of the present invention. The polylactic acid/polycarbonate resin composition can be used to form a molded product requiring heat resistance, impact strength, flame retardancy, and good mechanical properties and appearance, for example, an auto, auto parts, electronic parts, communication devices, office machines, and the like. In particular, it can be used to produce housings for electronics such as televisions, computers, printers, washing machines, cassette players, audio equipment, games, and the like.

The following examples illustrate the present invention in detail. These examples, however, should not in any sense be interpreted as limiting the scope of the present invention.

EXAMPLES

According to one embodiment, a polylactic acid/polycarbonate resin composition includes each component as follows.

(A) Mixed Resin
(A-1) Polycarbonate Resin
CALIBRE 200-3 made by Korean LG-DOW is used.
(A-2) Polylactic Acid Resin
4032D made by American NatureWorks LLC is used.
(B) Flame Retardant
PX-200 made by Japanese DAIHACHI as a phosphorus-based flame retardant is used.

(C) Acryl-Based Copolymer
(C-1) 190.15 g of ion-exchanged water, 0.015 g of didodecylsulfosuccinic acid sodium, 0.001 g of n-dodecyl mercaptan, 0.2 g of sodium bicarbonate ($NaHCO_3$), 7 g of butyl methacrylate, and 4 g of butyl acrylate are prepared into an emulsion in a 3 l four-necked flask reactor with an agitator, a thermometer, a nitrogen hole, and a circulative condenser. The emulsion is maintained at 75° C. in the reactor and substituted into a nitrogen atmosphere, and then, 0.05 g of potassium persulfate is added thereto. The resulting mixture is reacted for 120 minutes, preparing a seed latex. When the seed reaction is complete, a mixture including 63 g of butyl methacrylate, 41 g of butyl acrylate, 50 g of methyl methacrylate, 0.1 g of didodecylsulfosuccinic acid sodium, and 0.063 g of n-dodecyl mercaptan, as well as 20 g of potassium persulfate (0.5%-diluted solution) are simultaneously put into a reactor for 320 minutes, while maintaining the interior temperature at 75° C. The resulting mixture is polymerized through a further reaction for 60 minutes. The prepared copolymer is butyl acrylate/butyl methacrylate/methyl methacrylate having a weight average molecular weight of 1,500,000 g/mol.

(C-2) A copolymer is prepared according to the same method as in C-1 except 10 g of potassium persulfate is used as a polymerization initiator. The prepared copolymer is butyl acrylate/butyl methacrylate/methyl methacrylate having a weight average molecular weight of 4,100,000 g/mol.

(C-3) A copolymer is prepared according to the same method as in C-1 except 5 g of potassium persulfate is used as a polymerization initiator. The prepared copolymer is butyl acrylate/butyl methacrylate/methyl methacrylate having a weight average molecular weight of 8,000,000 g/mol.

(C-4) A copolymer is prepared according to the same method as in C-2 except no butyl methacrylate is used as a monomer. The prepared copolymer is butyl acrylate/methyl methacrylate having a weight average molecular weight of 3,900,000 g/mol.

(C-5) A copolymer is prepared according to the same method as in C-2 except ethyl methacrylate instead of butyl methacrylate is used as a monomer. The prepared copolymer is butyl acrylate/ethyl methacrylate/methyl methacrylate having a weight average molecular weight of 4,000,000 g/mol.

(C-6) Modiper A-4200 made by Nippon Oil and Fats Co., Ltd. is used as an acryl-based copolymer prepared by grafting glycidyl methacrylate into an acryl-based monomer in an amount of 10 wt %.

(D) Impact-Reinforcing Agent
METABLENE C-223A made by Mitsubishi Rayon Co. is used.

Examples 1 to 7 and Comparative Examples 1 to 3

The aforementioned components are put in a reaction extruder in an amount shown in the following Table 1 at a feed rate of 40 kg/hr, a screw rpm of 240, a temperature of 250 to 300° C., a screw configuration of 45φ regular, L/D=36, and then reacted together.

Next, the reactant is extruded at a temperature ranging from 220 to 280° C. in a common twin-screw extruder and prepared into pellets.

Experimental Example

After the pellets prepared according to Examples 1 to 7 and Comparative Examples 1 to 3 are dried at 80° C. for 4 hours, an ASTM dumbbell specimen is injection-molded by using a 6 oz injection molding machine and setting its cylinder temperature at 220 to 280° C., the mold temperature at 100° C., and the molding cycle at every 40 seconds. The properties of the specimen are measured as follows. The results are provided in the following Table 1.

(1) Thermal distortion temperature (VST): measured in accordance with ASTM D1525.
(2) Izod impact strength: measured in accordance with ASTM D256A.
(3) Flame retardancy: measured in accordance with UL-94 V test.
(4) Appearance: examined with naked eye regarding appearance of a molded product.
(5) Tensile strength: measured in accordance with ASTM D638.
(6) Flexural strength: measured in accordance with ASTM D790.
(7) Flexural modulus: measured in accordance with ASTM D790.

In contrast, Comparative Example 1 including no acryl-based copolymer has significantly deteriorated heat resistance and impact strength, and a bad appearance. In addition, Comparative Example 2 including an acryl-based copolymer in an amount outside of the range according to the present invention has deteriorated impact strength, flame retardancy, and mechanical strength. Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

TABLE 1

| | | | Examples | | | | | | | Comparative Examples | |
|---|---|---|---|---|---|---|---|---|---|---|---|
| | | unit | 1 | 2 | 3 | 4 | 5 | 6 | 7 | 1 | 2 |
| (A) mixed resin | (a1) polycarbonate resin | wt % | 70 | 70 | 70 | 70 | 70 | 70 | 70 | 70 | 70 |
| | (a2) polylactic acid resin | wt % | 30 | 30 | 30 | 30 | 30 | 30 | 30 | 30 | 30 |
| (B) flame retardant | | parts by weight* | 15 | 15 | 15 | 15 | 15 | 15 | 15 | 15 | 15 |
| (C) acryl-based copolymer | (C-1) | parts by weight* | 5 | — | — | — | — | — | — | — | — |
| | (C-2) | parts by weight* | — | 5 | — | — | — | 15 | — | — | 35 |
| | (C-3) | parts by weight* | — | — | 5 | — | — | — | — | — | — |
| | (C-4) | parts by weight* | — | — | — | 5 | — | — | — | — | — |
| | (C-5) | parts by weight* | — | — | — | — | 5 | — | — | — | — |
| | (C-6) | parts by weight* | — | — | — | — | — | — | 5 | — | — |
| (D) impact-reinforcing agent | | parts by weight* | 5 | 5 | 5 | 5 | 5 | 5 | 5 | 5 | 5 |
| thermal distortion temperature (VST, 5 kg) | | ° C. | 87 | 88 | 90 | 87 | 86 | 90 | 83 | 84 | 91 |
| ⅛" Izod Impact strength | | kgf · cm/cm | 12 | 14 | 15 | 12 | 12 | 15 | 12 | 10 | 10 |
| flame retardancy** UL-94 | | — | V0 | V0 | V1 | V0 | V0 | V1 | V0 | V0 | fail |
| appearance*** | | — | ◎ | ◎ | ◎ | ◎ | ◎ | ◎ | ○ | X | ◎ |
| tensile strength | | kgf/cm² | 720 | 740 | 740 | 750 | 750 | 730 | 650 | 700 | 650 |
| flexural strength | | kgf/cm² | 1000 | 1030 | 1000 | 990 | 1010 | 990 | 940 | 980 | 920 |
| flexural modulus | | kgf/cm² | 29000 | 30000 | 30000 | 29000 | 29000 | 29800 | 29000 | 29000 | 27000 |

*parts by weight: indicated based on 100 parts by weight of the mixed resin (A).
**grade of flame retardancy: V0 > V1 > fail
***grade of appearance: ◎ (excellent) > ○ (good) > Δ (normal) > X (bad)

Referring to Table 1, the pellets of Examples 1 to 7 including a polycarbonate resin, a polylactic acid resin, a flame retardant, an acryl-based copolymer with various molecular weights, and an impact-reinforcing agent according to one embodiment exhibit excellent heat resistance, impact strength, flame retardancy, and mechanical strength. In addition, the pellet of Examples 1 to 6 including an acryl-based copolymer having no reactive group has a better appearance than the one of Example 7 including an acryl-based copolymer having a reactive group.

What is claimed is:
1. A polylactic acid/polycarbonate resin composition comprising:
(A) about 100 parts by weight of a mixed resin comprising
(a1) 70 to about 90 wt % of a polycarbonate resin and
(a2) about 10 to 30 wt % of a polylactic acid resin;
(B) about 1 to about 50 parts by weight of a flame retardant based on about 100 parts by weight of the mixed resin;
(C) about 1 to about 30 parts by weight of an acryl-based copolymer wherein the acryl-based copolymer is a copolymer comprising at least two monomers selected from linear alkyl (meth)acrylate monomers, branched alkyl (meth)acrylate monomers, cyclic alkyl (meth)acrylate monomers, or combinations thereof; or a copolymer prepared by grafting a reactive group onto a monomer selected from linear alkyl (meth)acrylate monomers, branched alkyl (meth)acrylate monomers, cyclic alkyl (meth)acrylate monomers, or combinations thereof based on about 100 parts by weight of the mixed resin; and (D) about 1 to about 20 parts by weight of an impact-reinforcing agent based on about 100 parts by weight of the mixed resin.

2. The polylactic acid/polycarbonate resin composition of claim 1, wherein the polylactic acid resin has a weight average molecular weight ranging from about 80,000 to about 300,000 g/mol.

3. The polylactic acid/polycarbonate resin composition of claim 1, wherein the flame retardant comprises a phosphorus flame retardant, a nitrogen compound-based flame retardant, a silicon-based flame retardant, an inorganic flame retardant, or a combination thereof.

4. The polylactic acid/polycarbonate resin composition of claim 1, wherein the flame retardant is a phosphorus flame retardant.

5. The polylactic acid/polycarbonate resin composition of claim 1, wherein the acryl-based copolymer has a weight average molecular weight ranging from about 500,000 to about 10,000,000 g/mol.

6. The polylactic acid/polycarbonate resin composition of claim 1, wherein the acryl-based copolymer has a weight average molecular weight ranging from about 1,000,000 to about 10,000,000 g/mol.

7. The polylactic acid/polycarbonate resin composition of claim 1, wherein the impact-reinforcing agent comprises a core-shell copolymer, a linear olefin-based copolymer, or a combination thereof.

8. The polylactic acid/polycarbonate resin composition of claim 7, wherein the core-shell copolymer is prepared by grafting an unsaturated monomer selected from acryl-based monomers, aromatic vinyl monomers, unsaturated nitrile monomers, or combinations thereof onto a rubber polymer prepared by polymerizing a monomer selected from diene-based monomers, acryl-based monomers, silicon-based monomers, or combinations thereof.

9. A molded product made of the polylactic acid/polycarbonate resin composition according to claim 1.

* * * * *